(12) United States Patent
Liu et al.

(10) Patent No.: US 8,341,214 B2
(45) Date of Patent: Dec. 25, 2012

(54) SYSTEM AND METHOD FOR COMMUNICATING WITH A NETWORK OF PRINTERS USING A MOBILE DEVICE

(75) Inventors: Hua Liu, Fairport, NY (US); Arturo Lorenzo, Fairport, NY (US); Naveen Sharma, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 610 days.

(21) Appl. No.: 12/540,051

(22) Filed: Aug. 12, 2009

(65) Prior Publication Data

US 2011/0040823 A1 Feb. 17, 2011

(51) Int. Cl.
*G06F 15/16* (2006.01)
(52) U.S. Cl. ....... 709/203; 709/204; 709/223; 358/1.13; 358/1.15
(58) Field of Classification Search .................. 709/203, 709/204, 223; 358/1.13, 1.15
See application file for complete search history.

(56) References Cited

U.S. PATENT DOCUMENTS

| | | | |
|---|---|---|---|
| 7,266,822 B1* | 9/2007 | Boudnik et al. ............. | 718/100 |
| 7,409,452 B2 | 8/2008 | Ragnet et al. | |
| 7,562,223 B2 | 7/2009 | Ragnet et al. | |
| 7,768,982 B2* | 8/2010 | Zhang et al. ................ | 370/338 |
| 7,818,370 B2* | 10/2010 | Piper et al. .................. | 709/203 |
| 7,877,693 B2* | 1/2011 | Baek et al. .................. | 715/744 |
| 7,966,659 B1* | 6/2011 | Wilkinson et al. ............. | 726/22 |
| 2001/0003191 A1* | 6/2001 | Kovacs et al. ................ | 709/226 |
| 2002/0026478 A1* | 2/2002 | Rodgers et al. ............... | 709/205 |
| 2002/0042693 A1* | 4/2002 | Kampe et al. ................. | 702/186 |
| 2002/0161830 A1* | 10/2002 | Mukaiyama et al. ......... | 709/203 |
| 2002/0184310 A1* | 12/2002 | Traversat et al. ............. | 709/204 |
| 2003/0158936 A1* | 8/2003 | Knop et al. ................... | 709/224 |
| 2004/0044647 A1* | 3/2004 | Salmenkaita ..................... | 707/1 |
| 2004/0064568 A1* | 4/2004 | Arora et al. .................. | 709/228 |
| 2004/0162871 A1* | 8/2004 | Pabla et al. ................... | 709/201 |
| 2004/0243702 A1* | 12/2004 | Vainio et al. ................. | 709/224 |
| 2005/0060337 A1* | 3/2005 | Chou et al. ................... | 707/102 |
| 2005/0120073 A1* | 6/2005 | Cho ............................... | 709/201 |
| 2005/0172142 A1* | 8/2005 | Shelest et al. ................ | 713/191 |
| 2006/0010251 A1* | 1/2006 | Mrsic-Flogel et al. ....... | 709/245 |
| 2006/0165040 A1* | 7/2006 | Rathod et al. ................ | 370/335 |
| 2006/0203257 A1* | 9/2006 | McLuckie et al. ............ | 358/1.1 |
| 2006/0239190 A1 | 10/2006 | Kumar et al. | |
| 2006/0291459 A1* | 12/2006 | Bain ............................. | 370/389 |

(Continued)

OTHER PUBLICATIONS

Guttman, E., Perkins, C., Sun Microsystems, J. Veizades@Home Network, M. Day, Vinca Corporation, "Service Location Protocol, Version 2", Jun. 1999, Copyright The Internet Society (1999), pp. 1-55.

(Continued)

*Primary Examiner* — David Lazaro
*Assistant Examiner* — Waseem Ashraf
(74) *Attorney, Agent, or Firm* — Fay Sharpe LLP (57) ABSTRACT

A mobile client coupled to a network and a method for the mobile client to interact with nodes, including printer devices, which are coupled to the network, are provided. One or more respective nodes includes a software application executable by a host processor associated with the respective node on a software platform executed by the host processor. The application can interact with one of the printer devices to cause the printer device to perform a function. The mobile client includes an software platform executable by its processor for discovering the applications. The discovering of an application includes ascertaining that the application is available for execution and having the ability to activate the application.

23 Claims, 2 Drawing Sheets

U.S. PATENT DOCUMENTS

| | | |
|---|---|---|
| 2007/0050452 A1* | 3/2007 | Raju .............................. 709/204 |
| 2007/0110047 A1* | 5/2007 | Kim ............................... 370/389 |
| 2007/0124436 A1 | 5/2007 | Shepherd |
| 2007/0140110 A1* | 6/2007 | Kaler ............................ 370/218 |
| 2007/0300160 A1* | 12/2007 | Ferrel et al. ................... 715/744 |
| 2008/0091800 A1 | 4/2008 | Sorrentino et al. |
| 2008/0114631 A1* | 5/2008 | Matsumoto et al. ............... 705/7 |
| 2008/0126475 A1* | 5/2008 | Morris ........................... 709/203 |
| 2009/0019098 A1* | 1/2009 | Gunda et al. .................. 707/205 |
| 2009/0172082 A1* | 7/2009 | Sufuentes ..................... 709/203 |
| 2009/0177734 A1* | 7/2009 | Arthursson ................... 709/203 |
| 2009/0221307 A1* | 9/2009 | Wolak et al. .................. 455/466 |
| 2009/0247077 A1* | 10/2009 | Sklovsky et al. ............. 455/41.1 |
| 2009/0248729 A1* | 10/2009 | Bruno, Jr. et al. ............. 707/102 |
| 2010/0010994 A1* | 1/2010 | Wittig et al. ....................... 707/6 |
| 2010/0094925 A1* | 4/2010 | St Jacques, Jr. et al. ...... 709/202 |
| 2010/0100586 A1* | 4/2010 | Bae ............................... 709/203 |
| 2011/0013220 A1* | 1/2011 | Sabol et al. .................. 358/1.15 |

OTHER PUBLICATIONS

"A Process for Authorized Service Discovery in Distributed Computing Environments", Research Disclosure, Mason Publications, Hampshire, GB, No. 429, Jan. 1, 2000, pp. 168-170, XP002212114, ISSN: 0374-4353.

European Search Report for Application No. EP 10 17 1606, Date of completion: Dec. 22, 2011; Date of Mailing: Dec. 30, 2012, 4 pages.

\* cited by examiner

SYSTEM AND METHOD FOR COMMUNICATING WITH A NETWORK OF PRINTERS USING A MOBILE DEVICE

BACKGROUND

The present disclosure relates generally to a system and method for communicating with a network of printers. In particular, the present disclosure relates to a system and method for communicating with a network of printers using a mobile device.

A network of devices employing an Extensible Interface Platform (EIP) includes one or more servers, each associated with one or more client devices, where the stationary printer devices or stationary computer stations, such as personal computers. Each client device is in data communication with its associated server, and the servers may be in data communication with one another. The data communication is implemented on a communication network, such as an intranet, WAN or LAN. Authentication may be required in order for the client devices and servers to have access to communicate via the communication network. Each of the servers includes a processor and software executable by the processor, where the software includes an EIP platform that enables servers to communicate with the client devices and other servers and share resources. A network of devices implementing the EIP platform or communicating with devices that implement the EIP platform in a manner that involves use of the EIP platform is referred to as an EIP network.

The respective devices may be provided with EIP application software modules (EIP applications) which are software programs that interact with a printer device to cause the printer device to perform a function. A user of a client device may browse for an EIP application software module that is available on another device, select an EIP application, and request that the EIP application be executed. The EIP application is then executed by the processor of the device that is provided with that EIP application. The client device that requested the EIP application interacts with the EIP application. For example, the requesting client device may provide data that is to be used by the device that executes the EIP application for the executing. In another example, the requesting device may be instructed by the EIP application to perform a function, such as a related printing function.

SUMMARY

The present disclosure is directed to a mobile client coupled to a network. The mobile client interacts with nodes, including printer devices, which are coupled to the network. One or more respective nodes includes a software application executable by a host processor associated with the respective node on a software platform executed by the host processor. The application can interact with one of the printer devices to cause the printer device to perform a function. The mobile client includes a software platform executable by its processor for discovering the applications. The discovering of an application includes ascertaining that the application is available for execution and having the ability to activate the application so that it will be executed.

The present disclosure is also directed to a method for a mobile client to interact with nodes coupled to a network. The method includes coupling the mobile client via hardware and software to a network, wherein in addition to the mobile client at least one node including at least one printer device is coupled to the network. One or more nodes of the at least one node respectively includes a software application executable by a processor associated with the respective node on a software platform executed by the processor. The application can interact with a printer device of the at least one printer device to cause the printer device to perform a function. The method includes executing on a hardware processor of the mobile client an software platform, and discovering by the mobile client, while executing the software platform, at least one application executable by respective processors associated with the at least one node. The discovering of an application includes ascertaining that the application is available for execution, and providing information via a user interface wherein the provided information includes information providing the ability to activate the application so that it will be executed.

The present disclosure is further directed to a network system having at least one node coupled to a network and to at least one mobile client via the network. Each node includes a hardware processor, communication hardware and software executable by the associated processor for enabling the respective node to couple to the network. One or more respective nodes of the at least one node further includes a software application that is a software module executable by the processor associated with the respective node on a software platform executed by the processor. The application can interact with a printer device of at least one printer device coupled to the network to cause the printer device to perform a function. The application is further discoverable by the at least one mobile client. The application is discovered when a node of the at least one node provides the mobile client with information about the application including a means for activating the application. Upon activation, the application is executed.

Other features of the presently disclosed network system and method will become apparent from the following detailed description, taken in conjunction with the accompanying drawings, which illustrate, by way of example, the presently disclosed network system and method.

BRIEF DESCRIPTION OF THE DRAWINGS

Various embodiments of the present disclosure will be described below with reference to the figures, wherein.

DETAILED DESCRIPTION

Figure 1:
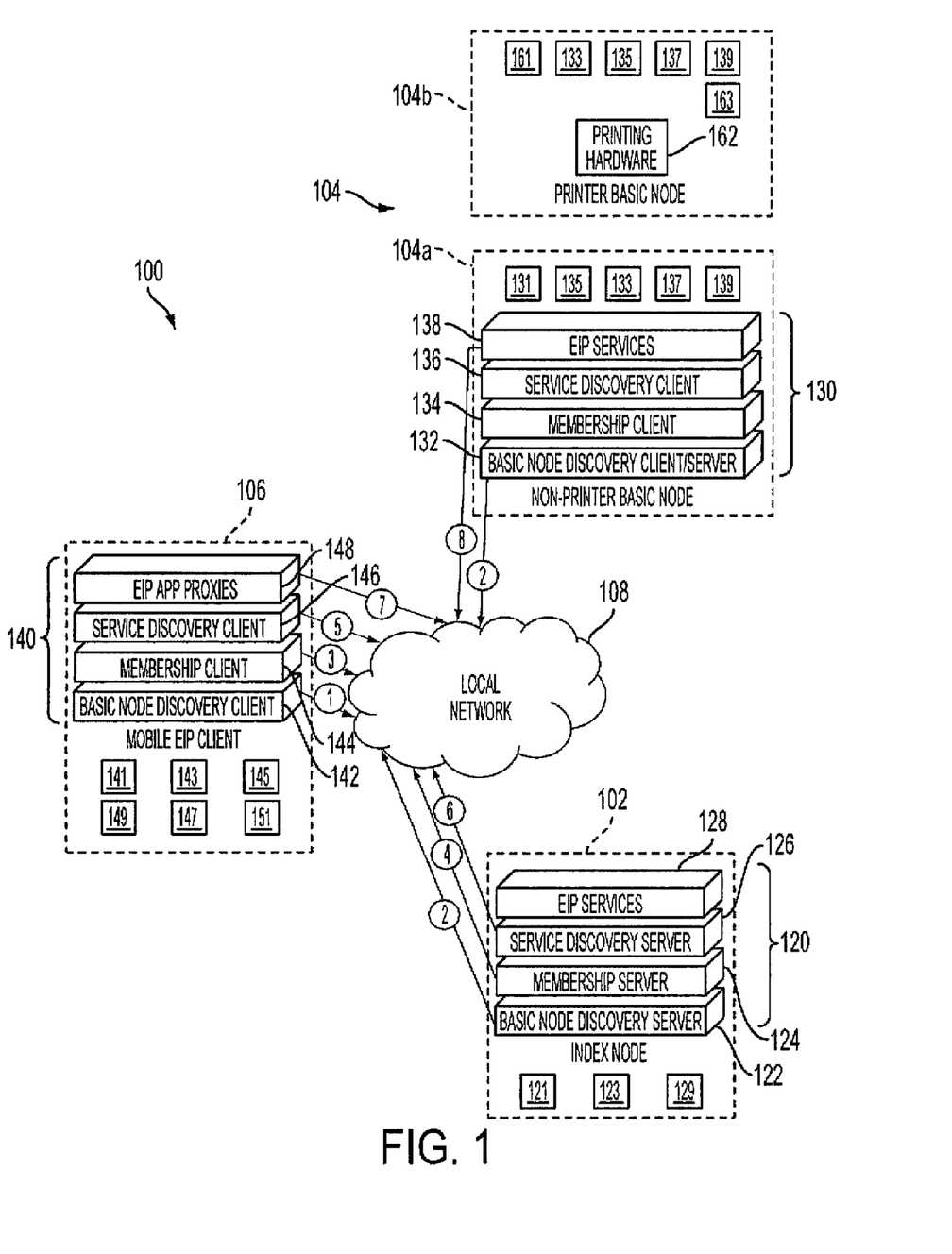
FIG. 1 is a block diagram of an exemplary EIP network system in accordance with the present disclosure.

Referring now to the drawing figures, in which like reference numerals identify identical or corresponding elements, the system and method for communicating with an EIP network system of printer devices using a mobile device in accordance with the present disclosure will now be described in detail. With initial reference to FIG. 1, an exemplary network system in accordance with the present disclosure is illustrated and is designated generally as EIP network system 100. Exemplary EIP network system 100 includes at least one node, including at least one index node 102, at least one basic node 104, and at least one mobile EIP client 106, which are each coupled to a local network 108. Minimally, the EIP network system 100 must include at least one index node 102 and a local network 108. The EIP network system 100 may employ a peer-to-peer architecture. FIG. 1 further shows exemplary actions (represented by directed arrows labeled 1-8) performed by the devices coupled to the EIP network system 100. The actions are described in greater detail in the description below with reference to FIG. 2.

Each index node 102 functions as a server and includes a computer having a hardware processing device 121 executing server software and an EIP server software platform 120. The server software may include commercially available software, such as Xerox Secure Access Unified ID System®, Xerox® Scan to PC Desktop® software, Equitrac Office®, etc., which enables the index node 102 to associate with and respond to requests from basic nodes 104 and mobile clients 106. The index nodes 102 are generally stable nodes that are always enabled. The index nodes 102 do not come and go freely to and from the EIP network, but are substantially always coupled to the EIP network. The index nodes 102 have sufficient computing power and storage capacity to communicate with other nodes coupled to the EIP network, form and maintain membership communities (discussed further below), provide information to members of their respective membership communities, and provide functionality for maintaining the p2p architecture The EIP server software platform 120 includes software modules that enable the index node 102 to communicate with other nodes coupled to the network 108, be discovered by other nodes coupled to the network, manage a membership community of selected nodes coupled to the network 108, enable members of its membership community to discover EIP application software modules (described further below), and optionally discover EIP application software modules and provide discoverable EIP application software modules. Exemplary software modules of the EIP server software platform 120 include Basic Node Discovery Server (BNDS) 122, Membership Server (MS) 124, Service Discovery Server (SDS) 126, and EIP Services (ES) 128. Each index node 102 further includes at least one storage device 123 (e.g., RAM, a hard drive, flash memory, etc.) accessible by the processing device 121 for storing data. The storage device 123 may be internal to or external to the index node 102. Additionally, each index node 102 includes a communication module 129 in data communication with the processing device 121 which includes hardware and software, as is known in the art, for coupling with the local network 108, which provides the capability to communicate with other index nodes 102 of the at least one index node 102, the at least one basic node 104, and the at least one mobile EIP client 106 via the local network 108. Coupling to the network and communicating via the network may be wired or wireless.

The EIP server software platform 120 includes a series of programmable instructions capable of being executed by the processing device 121. The series of programmable instructions can be stored on a computer-readable medium, such as storage device 123 for being executed by the processing device 121 for performing the functions disclosed herein and to achieve a technical effect in accordance with the disclosure. The functions of the respective software modules may be combined into one module or distributed among a different combination of modules.

The basic node 104 may be either a non-printer basic node 104a which includes a processor, such as a desktop personal computer, or a printer basic node 104b (also referred to as a printer node 104b), which is a printer device. The basic nodes 104 may come and go from the EIP network, e.g., be powered down and powered up. Rejoining the EIP network may be done automatically by the non-printer basic node 104a, but may need to be done semi-manually (e.g., with user interaction) by the printer node 104b.

The non-printer basic node 104a includes a hardware processing device 131 for executing basic client software including an EIP basic client software platform 130. EIP basic client software platform 130 includes software modules that enable the basic node 104 to discover other nodes coupled to the network 108, to join a membership community, optionally to be discovered by other nodes coupled to the network, and optionally to provide discoverable EIP application software modules. Exemplary software modules of the EIP basic client software platform 130 include Basic Node Discovery Client/Server (BNDC/S) 132, Membership Client (MC) 134, Service Discovery Client (SDC) 136, and EIP Services (ES) 138.

The printer 104b includes printing hardware 162, such as components for marking a substrate (e.g., marking paper with toner or ink), for providing the substrate, for outputting the substrate, and a hardware processing device 161 for controlling and coordinating the printer hardware.

Each basic node 104 further includes at least one storage device 133 (e.g., RAM, a hard drive, flash memory) accessible by the processing device 131 or 161 for storing data. The storage device 133 may be internal to or external to the basic node 104. Additionally, each basic node 104 includes a communication module 139 in data communication with the processing device 131 which includes hardware and software as is known in the art for providing the capability to communicate with the at least one index node 102, other basic nodes 104 of the at least one basic node 104, and the at least one mobile EIP client 106 via the local network 108.

The term "printer device" as used herein encompasses any apparatus or system, such as a digital copier, xerographic printing system, ink jet printing system, reprographic printing system, bookmaking machine, facsimile machine, multifunction machine, textile marking machine, etc., which performs a marking output function for any purpose. The modality for marking may include, for example, applying toner, ink, dye, etc., to the substrate or embossing, peening, etching, etc. the substrate. The substrate may be a material such as paper, cardboard, a transparency, a paper derivative, metal, plastic, glass, wood, cloth, etc.

With reference to the non-printer basic node 104a, the EIP basic client software platform 130 includes a series of programmable instructions capable of being executed by the processing device 131. The series of programmable instructions can be stored on a computer-readable medium, such as storage device 133, for being executed by the processing device 131 for performing the functions disclosed herein and to achieve a technical effect in accordance with the disclosure. The functions of the respective software modules may be combined into one module or distributed among a different combination of modules.

Each basic node 104 may optionally includes a display device 135 for displaying information to a user of the basic node 104, a user interface software module (UI) 137 for controlling display of information on the display device 135, and a user input device 163, such as a keypad or touch screen, for receiving requests or data input from a user. In the non-printer basic node 104a, the display device 135 may be a computer screen or monitor and user input device 163 may be a mouse and a keyboard. In the printer basic node 104b, the display device 135 may be an LED screen and user input device 163 may be a keypad and/or touch screen that are included in a console of the printer basic node 104b. The user interface is in data communication with the processor 131, display device 135 and input device 163 so that a user can communicate with the processor 131 by inputting information or receiving information. Information may be displayed in a variety of ways, such as graphically (e.g., as a graphical user interface (GUI)) or textually to the user, or may be provided in another medium, such as in audio or tactilely.

Each mobile EIP client 106 is a mobile computing device, such as a cellular phone, a smart phone (e.g., a cellular phone that has increased computing and storage power relative to a conventional cellular phone, and further has internet access), a personal digital assistant, or a laptop computer, which includes a hardware processing device 141 executing mobile EIP client software including a mobile EIP client software platform 140. Mobile EIP client software platform 140 includes software modules that enable the mobile client 106 to discover at least another node coupled to the network 108, to join a membership community, optionally to be discovered by other nodes coupled to the network, to discover EIP application software modules, and optionally to provide discoverable EIP application software modules. Exemplary software modules of the mobile EIP client software platform 130 include Basic Node Discovery Client (BNDC) 142, Membership Client (MC) 144, Service Discovery Client (SDC) 146, and EIP Application Proxies (EAP) 148. The mobile EIP client software platform 140 may be installed on or downloaded to the mobile EIP client 106.

The mobile EIP client software platform 140 includes a series of programmable instructions capable of being executed by the processing device 141. The series of programmable instructions can be stored on a computer-readable medium, such as storage device 143, for being executed by the processing device 141 for performing the functions disclosed herein and to achieve a technical effect in accordance with the disclosure. The functions of the respective software modules may be combined into one module or distributed among a different combination of modules.

The at least one storage device 143 (e.g., RAM, a hard drive, flash memory) is accessible by the processing device 141 for storing data. The storage device 143 may be internal to or external to the basic node 104. Each mobile EIP client 106 further includes a display device 145 for displaying information to a user of the mobile EIP client 106.

A user interface software module (UI) 147 may further be provided with the mobile EIP client 106 for controlling display of information on the display device 145. The information may be displayed in a variety of ways, such as graphically (e.g., providing a graphical user interface (GUI)) or textually to the user. The UI 147 may facilitate provision of information to the user in an audio fashion, e.g. via a speaker provided with the mobile EIP client 106, and/or in a tactile fashion, e.g., via a vibrator. The UI 147 interfaces with the mobile EIP client software platform 140 to exchange information between the user and the mobile EIP client software platform 140. The display device 145 may be a touch device that in conjunction with UI 147 allows the user to submit requests by touching the display device 145, e.g., at a particular location on the display device 145, such as where a particular request is displayed. Additionally, each mobile EIP client 106 includes a wireless communication module 149 in data communication with the processing device 141 which includes hardware and software as is known in the art for providing the capability to communicate with the at least one index node 102, the least one basic node 104, and other mobile EIP clients of the at least one mobile EIP client 106 via the local network 108.

The local network 108 includes hardware and software for coupling with devices, where the coupling is wired or wireless, and for supporting data communication between devices coupled to the network. A first and second device are coupled when they exchange data via wired or wireless channels, where the exchange of data may be directly between the first and second device or may be via an intervening device. The local network 108 may include, for example, an intranet, a LAN, a WAN, Ethernet connections, Bluetooth connections, a combination of the above, etc. The local network 108 further provides wireless access, such as by including a wireless access point (WAP) or a wireless Ad-Hoc network. The local network 108 may implement, for example, a wireless LAN (WLAN), a Wi-Fi network, fixed wireless data, global system for mobile communications (GSM), personal communications service (PCS), a combination thereof, etc., which allows the mobile EIP clients 104 to communicate via their wireless communication modules 149 with other devices coupled to the local network 108, including the index nodes 102 and the basic nodes 104. In one embodiment, the local network 108 may be configured to provide an enterprise cloud accessible by the index nodes 102, basic nodes 104 and mobile EIP clients 106.

The local network 108 may include two or more sub-networks which are coupled to one another. Each sub-network includes at least one node that is coupled to the sub-network, where the at least one node may include only basic nodes 104, only index nodes 102, or a combination thereof.

In the exemplary embodiment described, the network is an EIP network, the index nodes 102, basic nodes 104, and mobile EIP clients 106 execute EIP software modules 120, 130, and 140, respectively, and EIP applications are available for discovery and/or execution by the nodes of the EIP network. The disclosure is not limited to an EIP network, nodes that execute EIP software modules and/or discovery or execution of EIP applications. Other types of networks, executable software modules and applications are envisioned, provided that a first node can discover another node, the first node can discover an application that resides on another node, and at least one of the applications can interact with a printer device include among the network nodes to cause the printer device to perform a function.

The EIP server software module 120 of an index node 102 is now described. The BNDS 122 replies to queries from a BNDC/S 132 or BNDC 142 (described below) which resides on a basic non-printer node 104a for providing information to the BNDC/S 132 or BNCD 142 so that it can discover the index node 102 or another index node 102. The information includes the location (e.g., URL) of the index node being discovered. The BNDS 122 can provide location information or URL to other nodes, such as basic nodes 104 or mobile EIP clients 106, so that the other nodes can also discover nodes that the index node 102 has discovered. The index nodes discover each other and exchange information using existing and well known peer-to-peer protocols and algorithms, for example Chord or Pastry, which is beyond the scope of this disclosure. The MS 124 manages a membership community having at least one member including one or more basic nodes 104 or mobile EIP clients 106. The MS 124 allows a basic node 104 or mobile EIP client 106 to join its community to become a member thereof by providing it with a membership ID which is unique to the community and which identifies it as a member of the community. Using the membership ID, members can exchange information with the index node 102.

The MS 124 periodically receives membership renewal messages (also known as heartbeat messages) from its members. The renewal messages from a member may be requested by the MS 124 or may be sent independently by the member, in accordance with design choice. The request for the renewal messages or the receipt of renewal messages may be transmitted at regular time intervals, or may be triggered by the occurrence of an event, such as discovery of one or more new nodes coupled to the network, etc. When a renewal message is not received from a member after the passage of a selected time interval, the membership is cancelled and the member is no longer a member of the membership community. This may happen, for example, when a basic node 104 is disabled, e.g., powered down. The member can re-establish its membership anytime.

The SDS 126 receives information from its members which is related to EIP applications that the respective members have, and provides the members with information about EIP applications that are available from the members of the membership community in order that each member can discover available EIP applications provided by other members, as discussed further below. The index node 102 is itself a member of its membership community and information about any EIP applications that the index node 102 has is provided to the members of the membership community. EIP applications are discussed further below.

When the SDS 126 provides one of its members with information about available EIP applications, the SDS 126 may select from the available EIP applications a subset of EIP applications for which it will provide information to the member. The selection may be based on knowledge that the index node 102 has about compatibility between the member and the available EIP applications. This knowledge may include knowledge about resources or characteristics that the member has, and resources or characteristics that are required for using each available EIP application. Thus, if the member does not have a resource or characteristic that is required by an available EIP application the SDS 126 will not provide information about that EIP application to the member.

For example, when the member is a mobile EIP client 106, the SDS 126 selects available EIP applications that do not require a user to physically perform an action on the node executing the EIP application and only provides the mobile EIP client 106 information about the selected EIP applications. In this way, the user can activate the EIP applications that are presented without physically going to the node that it is executing on. In one embodiment the SDS 126 does not filter available EIP applications based on knowledge about resources or characteristics associated with a querying node, such as a mobile EIP client 106 or basic node 104. The filtering may be performed by the querying node instead.

The information provided about each available EIP application includes, for example, a description of the EIP application, a name or title of the EIP application, a small graphic symbol which represents the EIP application, such as an icon, and a means for activating the EIP application. The means for activating the EIP application includes, but is not limited to, a link or hyperlink to a software command that causes execution of the EIP application to begin, or the software command itself. The means for activating can be presented to the user of the receiving basic node 104 or mobile EIP client 106 on a display device (e.g., display device 145) as a graphic or textual hyperlink that a user can activate, e.g., by clicking on it with a mouse, where activation of the hyperlink causes the EIP application to execute on the processing device it is associated with.

Another example of means for activating includes displaying a GUI to the user on the display device 145 of the mobile EIP client 106 which includes a selection of user printable documents that the user can select and print and a selection of printer devices (which are basic nodes 104) that the user can select for printing the selected document. The user selects a document and a printer and uses the GUI displayed on the display device 145 to submit the selected document to the selected printer.

Additionally, the SDS 126 exchanges information about available EIP applications with other index nodes 102. The SDS 126 provides information about EIP applications that are available via other index nodes 102 to the members of the index node's 102 membership community so that the members can discover the EIP applications which are available via other index nodes 102.

The ES 128 includes a repository of EIP applications which the index node 102 itself stores (e.g., on the storage device 123), accesses, or links to. The EIP applications of the index node 102 are associated with the processing device 121 of the index node 102 such that the index node's 102 own processing device 121 executes an EIP application included in its ES 128 when the EIP application or its associated link is activated. When the index node 102 "has" or hosts an EIP application, this means that the EIP application is included in the repository of the index node's ES 128 and is executable by the index node's processing device 121.

The index node 102 stores references and information related to EIP applications that it does not have but are hosted on other index nodes 102 or basic nodes 104. The references include location information that can be used to activate respective EIP applications. The information includes descriptions about characteristics of the respective EIP application that can be used to find an EIP application having a specific characteristic. When the index node 102 receives a query from the mobile EIP client 106 for an EIP application that it does not host itself, it responds with the reference to the remote EIP application. From this point on, the mobile EIP client 106 can directly interact with the host node of the EIP application. When the EIP application is executed, the EIP application can interact with a printer 104b to cause the printer to perform a function. The function performed by the printer 104b may include a printing, scanning, faxing, emailing, providing data (such as tracking data related to print jobs performed) and/or processing function. Alternatively, the EIP application may not require a printer 104b to perform a function, and may be performed independent of a printer 104b.

Each EIP application included in the ES's 128 repository is provided with a means for activating the EIP application, wherein the means for activating includes a means for initiating execution of the EIP application by the processing device 121 of the node which has the EIP application. The EIP applications which the index node 102 has are presented as available by the SDS 126 of the index node 102 and may further be presented as available by other index nodes 102 to members of their respective membership communities. The EIP applications which are presented as available to a basic node 104 or mobile EIP client 106 can be discovered by the basic node 104 or mobile EIP client 106. Discovering an EIP application includes ascertaining that the EIP application is available for execution, which is accomplished when an index node 102 presents the EIP application as being available. Discovering an EIP application further includes having the ability to activate the discovered EIP application so that it will be executed by the processor of the index node 102 or basic node 104 it is associated with. This is accomplished when the discovering node is provided with the means for activating the EIP application.

The basic client software platform 130 of a non-printer node basic 104a is now described. The BNDC/S 132 includes a client (a BNDC) and a server (a BNDS). The BNDC queries a BNDS (i.e., a BNDS of the BNDC/S 132 of another non-printer basic node 104a or a BNDS 122 of an index node 102) for discovering an index node 102 in order to learn its location (e.g., URL) and in order to be able to communicate with the discovered index node 102 using the learnt location information or URL. The querying BNDC may receive location information about more than one index node 102 from one or more BNDSs, and the BNDC may select the index node 102 that it will discover (e.g., use the URL to communicate with the selected index node). It may also store the location information received about the more than one index node 102 so that it can use the information to answer queries as described below.

The BNDS of the BNDC/S 132 replies to queries from BNDCs (i.e., a BNDC of the BNDC/S 132 of another non-printer basic node 104a or the BNDC 142 of a mobile EIP client 106) to provide location information to the querying node. The BNDS can use the stored location information.

The MC 134 is now described. The MC 134 handles joining a membership community of a selected discovered index node 102. If the MS 124 of the selected index node 102 provides the non-printer basic node 104 with a membership ID, the non-printer basic node 104 can join the selected index node's 102 membership community. The MC 134 then periodically renews the subscription to the community it joined, which may include transmitting periodic renewal messages to the selected index node 102 and/or responding to periodic signals transmitted by the index node 102 with a renewal message. The periodic renewal messages may be sent at regular time intervals or upon occurrence of an event, such as receipt of a request for a renewal message from the selected index node 102. When a renewal message is not transmitted by the non-printer basic node 104 for a selected time interval (such as when the non-printer basic node 104a is disabled (e.g., powered down)) the non-printer basic node 104 loses its membership to the membership community, and must regain access to the membership community anew.

The SDC 136 queries the selected index node 102 for available applications, which may include EIP applications and non-EIP applications which do not require the use of an EIP platform, since some EIP applications need the support of non-EIP applications. For example, a scan-to-repository EIP application may need to use a file transfer protocol (FTP) application. In response to its query, the SDC receives information associated with applications that are presented as available by the selected index node 102 once the non-printer basic node 104a has joined the membership community with which the selected index node 102 is associated.

When an application is presented as available to the SDC 136, it is understood that the presented application is available for execution by the processing device it is associated with. The information received by the SDC 136 about available applications may include a means for activating one or more of the available applications, which is sufficient information for the non-printer basic node 104a to discover those available applications. If the means for activating is not provided for any of the presented available applications, the SDC 136 can request that the selected index node 102 provide that information. The SDS 126 of the selected index node 102 responds with the requested information.

The SDC 136 further may interact with a user interface provided with the non-printer basic node 104a that displays information to a user of the non-printer basic node 104a, e.g., on a display device, such as a monitor or LCD screen, and receives information input by the user, e.g., via a user input device, such as a keypad, mouse and/or keyboard. The non-printer basic node 104a (e.g., via user action) can select one or more available applications to activate.

The ES 138 includes a repository of EIP applications which the non-printer basic node 104 itself stores (e.g., on the storage device 133), accesses, or links to. The EIP applications of the non-printer basic node 104 are associated with the processing device 131 of the non-printer basic node 104, such that the non-printer basic node's 104 own processing device 131 executes an EIP application included in its ES 138 when the EIP application or its associated link is activated. When the non-printer basic node 104 "has" or hosts an EIP application, this means that the EIP application is included in the repository of the non-printer basic node's ES 138 and is executable by the non-printer basic node's processing device 121. When the EIP application is executed, the EIP application can interact with a printer 104b to cause the printer 104b to perform a function. The function performed by the printer 104b may include a printing, scanning, faxing, emailing, providing data (such as tracking data related to print jobs performed) and/or processing function. Alternatively, the EIP application may not require a printer 104b to perform a function, and may be performed independent of a printer 104b.

After the non-printer basic node 104a joins the membership community of the selected index node 102, the SDC 136 of the non-printer basic node 104a registers the EIP applications included in its associated ES 138 repository and information associated with the respective EIP applications with the SDC 126 of the index node 102. The registration remains valid as long as the non-printer basic node 104a renews its membership before it is expired. When the non-printer basic node 104a fails to renew its membership, the SDS 126 of the index node 102 deletes the information associated with the EIP applications registered from the non-printer basic node 104a. When the ES 138 gains or loses an EIP application, it reports the gain or loss to the SDS 126, which adds or deletes the EIP application registration accordingly. The information reported for each respective EIP application includes, for example, a digital form of a description of the EIP application, a name or title of the EIP application, a small graphic symbol, such as an icon, which represents the EIP application, and/or a means for activating the EIP application. The EIP applications reported to the selected index node 102 are presented to the members of the selected index node's 102 membership community as available EIP applications which can be discovered by the members. Additionally, the selected index node 102 may report its available EIP applications, including the EIP applications reported by the non-printer basic node 104a, to other index nodes 102, which in turn may present these EIP applications to the members of their respective membership communities as available.

In the present embodiment, the non-printer basic node 104a does not require a display device or other means for exchanging information with a user in order to enable the use of EIP applications included in its ES 138, such as by a printer 104b or mobile EIP client 106. Additionally, user interaction is not necessary for discovering an index node 102, responding to a query by a mobile EIP client or another basic node 104 that is looking for an index node to discover, selecting an index node 102, joining a membership community, or reporting its EIP applications to its associated index node. In another embodiment, user interaction may be allowed, such as for selecting an index node 102.

The function of the printer 104b is now described. The printer 104b may be provided with the EIP basic client software platform 130 and function similar to the description above for the non-printer basic node 104a. However, provision of the EIP basic client software platform 130 typically must be done at the time of manufacture, and existing printers are not provided with the EIP basic client software platform 130. Accordingly, in a printer 104b that is not provided with an EIP basic client software platform 130, EIP applications that are provided by the non-printer basic node 104a and the index node 102 have to be manually registered at the printer 104b and have to be manually removed when the registered EIP services are not available. A user, via the printer's 104b UI 137, can browse and select registered EIP applications. Selection of an EIP application can includes activating it so that it will be executed. The printer 104b is typically a passive device that browses for and retrieves the information that it needs without querying or requesting specific information.

In order for users to use an EIP application on the printer 104b, the EIP application has to be manually registered on the printer 104b. The manual registering of EIP applications with the printer 104b and/or configuring of the printer 104b are performed by using an EIP registration tool which is a software module that can be installed on and executed by a computing device networked to the printer 104b, such as desktop computer. This desktop can be the index node 102 or a non printer basic node 104a or any computer that wired into the network temporarily or permanently. It is used only for registering the EIP application on the printer 104b, and it is not involved in activating or executing the EIP application.

Manually registering an EIP application with a printer 104b includes executing the EIP registration tool on the computing device that is networked to the printer 104b. The registration tool prompts the user to input via the computing device the IP address of the printer 104b and an administrative username and password that proves authority to register EIP applications. Then the user registers an EIP application hosted remotely by inputting the URL of the EIP application, the URL of a display icon (e.g., a picture), the URL to a description of the EIP application, the name of the EIP application, and the name of the vendor of the EIP application.

After manual registration, each registered EIP application is displayed to the user on the display device 135 of the control panel of the printer 104b, e.g., via a menu or GUI. For example, the icon and name associated with each registered EIP application are displayed. The icons or menu selections function as soft-buttons which can be selected and actuated by a user operating the control panel's user input device 163, e.g., via a GUI or menu. The actuated icon causes the associated EIP application to be executed, e.g., by its host processor 121 or 131. The EIP application can exchange information with the user of the printer 104b via the printer 104b's UI 137. For example, when the EIP application needs data input from the user, it displays a request for user input on the display device 135. The user inputs information via the input device 163 and/or the GUI.

The mobile EIP client software platform 140 is now described. The mobile EIP client 106 couples to the local network 108. Coupling to the local network 108 includes the mobile EIP client 106 moving into a signal range of the local network 108 so that the wireless communication module 149 can exchange signals with one or more devices coupled to the local network 108, e.g., via a WAP of the network 108, and transmitting and/or receiving signals to or from one or more of those devices.

Additionally, the mobile EIP client 106 must be authenticated by security provisions of the local network 108 in order that the local network 108 will allow the mobile EIP client 106 to communicate with other devices that are coupled to the local network 108. The mobile EIP client 106 is programmed ahead of time so that it can be authenticated. The process of authentication can be automatic without any intervention by a user of the mobile EIP client 106, or the process of authentication may require that the user initiate the process and/or enter authentication information. An example of automatic authentication is as follows, although is not limited thereto.

Once the mobile EIP client 106 has entered the wireless zone of the local network 108 within which it can exchange signals with devices coupled to the local network 108, an administrating device coupled to the local network 108 automatically requests authentication information, such as an identification code (ID) and a password. The mobile EIP client 106 automatically responds with the requested authentication information, and the local network 108 then allows the mobile EIP client 106 to have access to the local network 108. The term "neighborhood" denotes the resources available on the local network 108, e.g., resources available to an entity or resource that is coupled to or available on the local network 108. For example, when a mobile EIP client 106 is coupled to the local network 108, the mobile EIP client's 106 neighborhood includes the index nodes 102 and basic nodes 104 and any EIP application software modules that it can access.

The BNDC 142 queries nodes coupled to the local network 108 in order to learn what index nodes 102 are available to be discovered. This querying may be performed by transmitting a multicast message via the local network 108 that includes the request for location information for available index nodes and a return address that replies can be sent to. The BNDC 142 receives replies to its query and thus receives an address associated with one or more available respective index nodes 102.

Then the BNDC 142 selects an index node 102 from the available index nodes 102. The BNDC 142 then uses the address for the selected index node 102 to exchange data with the selected index node 102 for joining its membership community. While it is described in the present example that only one index node 102 is selected, it is envisioned that basic nodes 104 and mobile EIP clients 106 may select more than one index node 102, and join the membership community associated with each of the selected index nodes 102. Once the mobile client 106 has ascertained that an index node 102 exists and has successfully exchanged data with the index node 102, it is considered that the mobile client 106 has discovered the index node 102.

Selection of an index node 102 may be based on a variety of factors, such as, but not limited to, selecting the first index node 102 for which an address was obtained, an index node 102 with which the basic node has a successful and/or satisfactory history of discovering the index node 102 and/or EIP applications, an index node 102 whose membership community the mobile EIP client 106 prefers to join, and/or an index node which has selected hardware and/or software resources, or allowing a user of the mobile EIP client to choose. If the address for only one index node 102 is received, that index node 102 is selected.

As described above, in the present example, the mobile EIP client 106 transmits a message via the local network 108, such as a multicast message, which reaches many or all of the index nodes 102 and/or basic nodes 104 that are coupled to the local network 108. The message requests the address for one or more index nodes 102 that potentially could exchange data with the requesting mobile EIP client 106. Index nodes 102 and basic nodes 104 that received the mobile EIP client's message requesting addresses of index nodes 102 respond with either their own address (in the case of index nodes 102 only), or the addresses of index nodes 102 that they know of.

The MC 144 joins the community associated with the selected index node 102. If the MS 124 of the selected index node 102 provides the mobile EIP client 106 with a membership ID, the mobile EIP client 106 can join the selected index node's 102 membership community. The MC 144 periodically renews the subscription to the membership community it joined. This may include transmitting periodic renewal signals to the selected index node 102 and/or responding to periodic signals transmitted by the selected index node 102. When a renewal signal is not transmitted by the mobile EIP client 106 for a selected time interval the mobile EIP client 106 loses membership in the membership community, and can only regain access to the membership community by going through the membership process anew.

The SDC 146 communicates with the selected index node 102 and receives information associated with EIP applications that are presented as available by the selected index node 102 once the mobile EIP client 106 has joined the membership community with which the selected index node 102 is associated. When an EIP application is presented as available to the SDC 146, it is understood that the presented EIP application is available for execution by the processing device it is associated with. A proxy of the EIP application is created on the mobile EIP client 106 to enable the interactions with the EIP application hosted on the index node 102 or the non-printer basic node 104. The information received by the SDC 146 may include a means for activating one or more of the presented EIP applications, which is sufficient information for the mobile EIP client 106 to discover those presented available EIP applications. If the means for activating is not provided for any of the presented EIP applications, the SDC 146 can request that the selected index node 102 provide that information. The SDS 126 of the selected index node 102 responds with the requested information.

In one embodiment, the EIP application is executed only by its host processor. In another embodiment, the index node 102 or basic node 104 hosting the EIP application is a web server. In still another embodiment, the EIP application or a portion thereof is executed by the mobile EIP client 106, particularly where the mobile EIP client 106 is a device with a large amount of computing power, such as a laptop computer. In yet another embodiment, execution of the EIP application or a portion thereof is generally successful when the mobile EIP client is a substantially permanent member of the EIP network 100 and/or does not frequently come and go with respect to joining the EIP network and/or a membership community.

The SDC 146 further interacts with user interface 145 for providing information about discovered EIP applications to a user of the mobile EIP client 106, e.g., by displaying the information on display device 145, and by receiving requests or data input from the user, e.g., via a user input device 151, such as a keypad. The mobile EIP client 106 (e.g., via user action) can select one or more available EIP applications to activate. For example, information related to each of the available EIP applications received by SDC 146 may be presented to the user of the mobile client 106 by the UI 147 by displaying on display device 145 a title or icon and an activation means for each EIP application, where the activation means is a hyperlink that the user can select (e.g., click on) to cause a selected EIP application to execute on its associated processor. Additionally, the mobile client 106 may provide data that is to be used by the EIP application during execution of the EIP application.

The SDC 146 may initiate a request for an EIP application. The request may be for a specific EIP application or for a category of EIP applications. An EIP application may be categorized, for example, based on a characteristic, a function it performs, a type of problem it solves, etc. The request may be initiated by a user action, such a user selection of an option provided on the GUI or a user entered command. In one example, a request submitted by the SDC 146 may be for an EIP application which performs math related functions.

The index node 102 associated with the mobile EIP client 106 replies to a request for an EIP application by providing a list of EIP applications that fit the request. In response to the request in the example above for an EIP application which performs math related functions the index node 102 will reply with a list of EIP applications that perform mathematical functions. The SDC 146 may display the list of EIP applications received from the index node 102 to the user. The SDC 146 selects an EIP application from the list, where the selection may be in accordance with a user selection, or based on some other criteria.

The list of EIP applications provided by the index node 102 may include information associated with each EIP application. Alternatively, the information may be provided to the SDC 146 upon request (the request may be user initiated as well). Such information includes, for example, a monetary charge for use of the EIP application, specifications (e.g., memory capacity or processing speed) required for using the EIP application, and/or communication protocols, such as language, format, syntax, etc. used by the EIP application.

The EAP proxy 148 or the SDC 146 may filter the available EIP applications by selecting only EIP applications that do not require a user to physically perform an action on the node executing the EIP application and only provides the mobile EIP client 106 information about the selected EIP applications. Selection of EIP applications may also be based on whether the mobile EIP client 106 fulfills the requirements associated with the respective EIP applications and/or the ability of the mobile EIP client 106 to conform to standards, such as the communication protocols, associated with the respective EIP applications.

Once the user or SDC 146 selects an EIP application, the EAP proxy 148 configures the mobile EIP client 106 to facilitate communication with the EIP application. The configuring by the EAP proxy 148 includes complying with (e.g., conforming to) the standards associated with the selected EIP application. The complying may also include negotiating or setting up protocols for communicating with the host processor and with the selected EIP application. Setting up the protocols, includes, for example, transmitting to the host processor, or receiving from the host processor, information regarding the protocol, format, syntax, language, etc., that is used or understood by the mobile EIP client 106 or the host processor and the selected EIP application. The setting up the protocols includes coming to an agreement regarding the protocol, format, syntax, language, etc., to be used during communication between the mobile EIP client 106 (including its EAP proxy 148), and the host processor (including the selected EIP application) in order that communication can be successful. In other words, either the mobile EIP client 106 or the host processor may conform to other's standards, or a combination thereof.

The EAP proxy 148 interacts with the UI 147 of the mobile EIP client 106 in order for the UI 147 to provide the user with an interface, e.g., which includes a GUI, through which the user can communicate with the selected EIP application, provide data to the EIP application for the EIP application to use during execution of the EIP application. The GUI is configured to be compatible with the mobile EIP client 106 whose processor 141 it is executing on. For example, the GUI provided for a smart phone will be customized for the smart phone, and will be different from the GUI provided for a laptop, where that GUI is customized for the laptop.

Via the GUI the selected EIP application can respond to the user's requests and provide the user with information. The GUI may be configured as a webpage that is displayed to the user on the display device 145. In this way, the user can use the selected EIP application in the same fashion as if the user was using the selected EIP application from the basic node 104 that has the EIP application. The user has the same ability to use the selected EIP application as he would have if he were using it from the console of the basic node 104, be it a printer device basic node 104 or a computer basic node 104. In this embodiment, the selected EIP application, however, is not executed by the processor of the mobile EIP client 106, but by the host processor of the selected EIP application. The proxy EIP application provides an interface for the mobile EIP client 106 user to communicate with the EIP application and can invoke local functions (e.g., a camera or file browser function) provided by the mobile EIP client 106, to retrieve information (e.g., for example pictures or files) and provide the information as input to the EIP application.

The EIP server software platform 120, EIP basic client software platform 130, and/or mobile EIP client software platform 140, may further include an accounting module. The accounting module tracks usage by the mobile EIP client 106 or basic client 104 of the EIP applications, such as for the purpose of billing the user for the tracked usage.

In one embodiment, the printer basic client node 104b may be provided with at least a portion of the software modules included in the EIP basic client software platform 130 and/or the mobile EIP client software platform 140 and have the functionality of the non-printer basic client 104a (e.g., to automatically discover an index node 102 and join its membership community, and/or to store EIP applications so that they are available to other nodes) or the functionality of the mobile EIP client 106 (e.g., to automatically discover an index node 102 and join its membership community, and/or to discover EIP applications and use them). In another embodiment, the non-printer basic client node 104a is provided with the software modules included in the mobile EIP client software platform 140 (e.g., including the SDC 146 and the EIP app proxy 148) and have the functionality of the mobile EIP client 106 (e.g., to discover EIP applications and use them).

Figure 2:
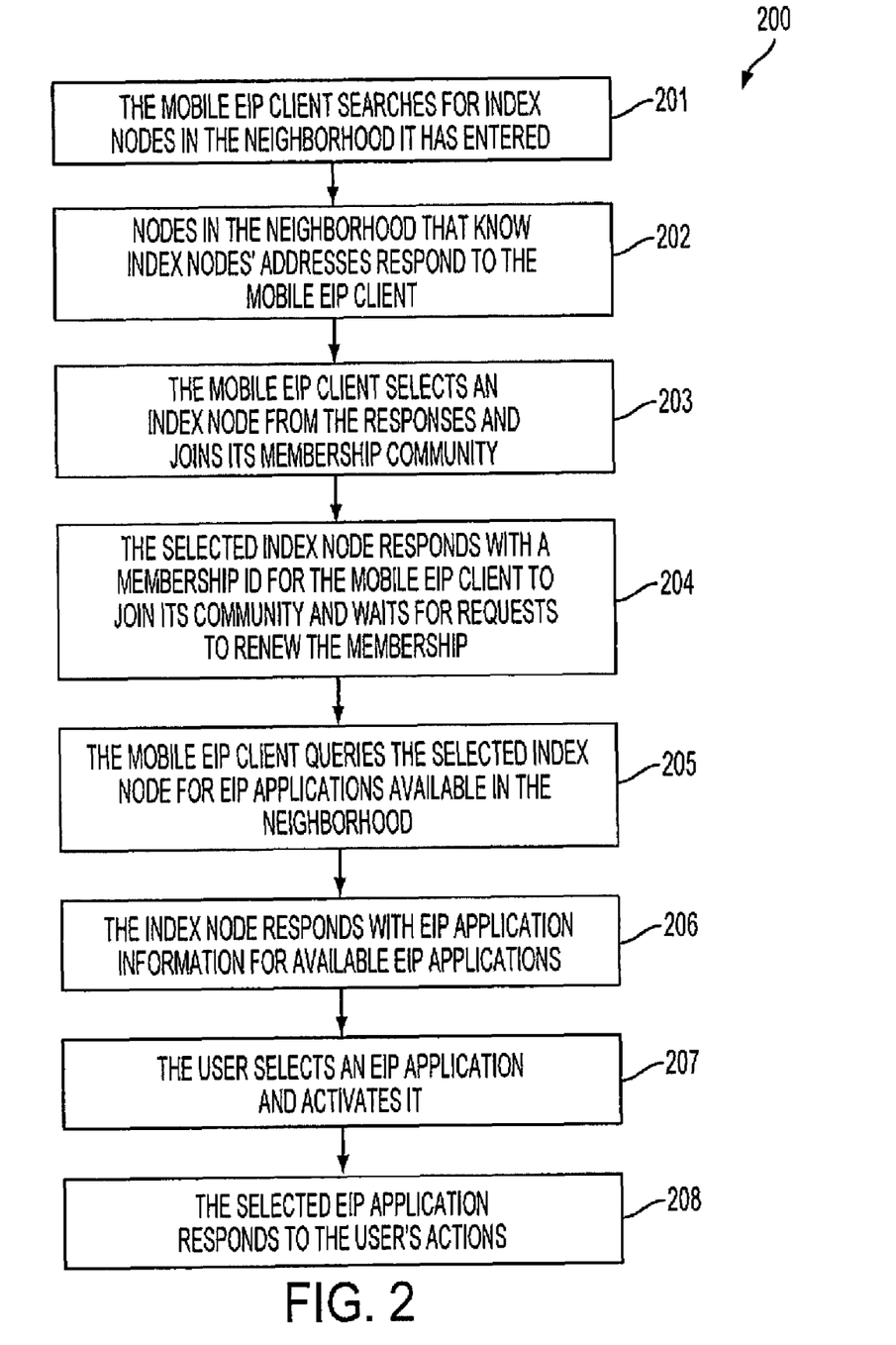
FIG. 2 is a flowchart of actions performed by devices included in the EIP network system.

With reference to FIG. 2, a flowchart 200 is provided which shows exemplary steps performed by devices of the EIP network system 100 when a mobile EIP client 106 enters a neighborhood associated with the local network 108. The steps 201-208 correspond, respectively, to exemplary actions 1-8 shown in FIG. 1. It is assumed that the mobile EIP client 106 has already been authenticated with local network 108. Step 201, which corresponds with action 1 in FIG. 1, may be initiated automatically, e.g., upon successful authentication, or may be initiated by a user action, such as activating a button provided on the mobile EIP client 106. The button may be a physical button or a soft button which is provided by the mobile EIP client software platform 140 via a GUI displayed on the display device 145. At step 201, the BNDC 142 searches for addresses, e.g., Uniform Resource Locators (URLs), related to index nodes 102 in the neighborhood of network 108. This can be performed by generating a multicast which announces the presence of the mobile EIP client 106 and requests a reply with the URL of one or more index nodes 102 from all devices that received the multicast.

At step 202, which corresponds with action 2 in FIG. 1, any basic node 104 or index node 102 that knows the address (e.g., URL) of one or more index nodes 102 replies to the multicast. In FIG. 1 it is shown that both the basic node 104 and the index node 102 replied to the multicast. The BNDS 122 of the index node 102 and the BNDC/S 132 of the basic node 104 process the multicasts and respond with the requested information. At step 203, which corresponds with action 3 in FIG. 1, the BNDC 142 of the mobile EIP client 106 selects an index node 102 corresponding to the URLs received in the replies. The MC 144 of the mobile EIP client 106 communicates with the selected index node 102 requesting to join its community. Once the mobile EIP client 106 has joined the membership community, and while it is still present in the neighborhood, the MC 144 renews its membership periodically, e.g., by transmitting membership renewal requests.

At step 204, which corresponds with action 4 in FIG. 1, the MS 124 of the selected index node 102 responds to the mobile EIP client's 106 request to join its community by providing the mobile EIP client 106 with a membership ID. The MS 124 of the index node 102 waits for membership renewal requests from the mobile EIP client 106. At step 205, which corresponds with action 5 in FIG. 1, the SDC 146 of the mobile EIP client 106 queries the SDS 126 of the index node 102 for EIP applications available in the neighborhood. The mobile EIP client 106 is only interested in EIP applications that do not require the mobile EIP client 106 to perform any activities that a printer device can do and that a mobile computing device cannot do, such as activities that are performed by a printing or scanning mechanism. The query may also be specific for EIP applications having certain characteristics.

At step 206, which corresponds with action 6 in FIG. 1, the SDS 126 of the index node 102 responds with the requested EIP application information for available EIP applications. Since the node requesting available EIP applications is a mobile EIP client 106, the SDS 126 or EIP proxy app 248 selects EIP applications from the available EIP applications which do not require a user to physically perform an action on the node executing the EIP application.

At step 207, which corresponds with action 7 in FIG. 1, the information received is provided to the user via the mobile EIP client 106's UI 147. The information provided to the user is sufficient for the user of the mobile EIP client 106 to use in order to access and/or activate the available EIP application (s). For example, the information received in step 206 may be displayed to the user as a link to one or more EIP applications. The user may select one or more of the available EIP applications and activate it. Upon activation of one of the selected EIP applications by the user, the corresponding EIP application is activated at the index node 102 or basic node 104 which hosts the selected EIP application in its ES 128 or ES 138.

At step 208, which corresponds with action 8 in FIG. 1, the selected EIP application responds to the user's actions and interacts with the user. The EAP 148 of the mobile EIP client 106 conforms to protocols and standards required by the selected EIP application and in conjunction with the UI 147 provides the user with an interface, such as a GUI, through which the user can use and communicate with the selected EIP application and the selected EIP application can respond to the user's requests and provide the user with information. The GUI may be configured as a webpage that is displayed to the user on the display device 145. The user can use the selected EIP application in the same fashion as if the user was using the selected EIP application from the basic node 104 which has the EIP application.

One example of an EIP application and its use is an EIP application named Follow Me Documents (FMD) in which the user scans in a document using a printer 104 MFD located at a first location, such at the corporate office in which the user is generally based, e.g., in N.Y., NY. Using the EIP application, the user can request that the scanned in document be available to the user when the user goes to another location, such as for printing out the document in a second location when the user arrives there. The scanned in document may be stored in a dedicated EIP repository, such as a cloud, or in a company repository (e.g., which is accessible to the devices of the EIP system 100 and may be accessible to non-EIP capable devices as well).

In one implementation of the FMD EIP application, the user uses the FMD EIP application on a printer 104b located in a first location to scan a document, where the printer 104b belongs to a first EIP network system 100. The document is stored on the dedicated EIP repository. The document may be provided in a variety of formats, including formats that support text, graphics, or video (such as SMS or MMS). The first and second locations must each provide an index node 102 or a basic node 104 that is executing the EIP server software platform 120, and where the ES 148 includes the EIP application FMD.

Upon arrival at a second location having a second EIP network system 100, where the second location may be, for example, a corporate office located in a different city or a home office, the mobile EIP client 106 joins the local neighborhood of the second network 100 and becomes a member of the community associated with one of its servers 102. The mobile EIP client 106 is notified that the FMD EIP application is available. The user activates the FMD EIP application and is provided with a webpage displayed on the display device 145 of the mobile EIP client 106. The FMD EIP application notifies the user that the document is available, e.g., for printing, at the user's current location. If the user is located, for example, at a corporate office located in Boston which has access to the company repository, the document can be retrieved from the company repository by the user or a selected printer 104b and printed on the selected printer 104b.

The FMD EIP application handles, at the user's request, retrieving the document, e.g., as an email attachment, and printing the document. All of this can be done by the user using his mobile EIP client 106 and without touching a computer or a printer console. Additionally, the user can use the FMD EIP application in a similar way to share documents with other mobile EIP clients 106 or other basic nodes 104 other than for printing on the basic nodes 104. Once the user has provided the document to the FMD EIP application, e.g., as an email attachment, a user of another mobile EIP client 106 or of a basic node 104 can retrieve the document, e.g., as an email attachment, using the FMD EIP application.

As mentioned above, the second location may be a home office which includes an EIP network system 100 having an EIP server 102, a WAP, and optionally a basic node 104. The EIP server 102 of the home office executes server software, such as home server software, and EIP server software platform 120. Examples of home server software which are commercially available include open source Apache and Windows™ Home Server.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A mobile client comprising:
   a hardware processor;
   communication hardware and communication software executable by the processor both for enabling the mobile client to couple to a network, wherein in addition to the mobile client at least one node including at least one printer device is coupled to the network, wherein one or more nodes of the at least one node respectively includes an application software module executable by a host processor associated with the respective node, wherein the application can interact with a printer device of the at least one printer device to cause the printer device to perform a function; and
   a software platform executable by the processor for discovering at least one application executable by respective host processors associated with the at least one node;
   wherein the mobile client discovering an application includes ascertaining that the application is available for execution, having the ability to activate the application so that it will be executed, and filtering out an application that requires a user to perform a physical action with a printer device of the at least one printer device.

2. The mobile client in accordance with claim 1, wherein execution of the platform includes discovering one or more nodes of at least one node that is coupled to the network, wherein the mobile client discovering a node includes ascertaining the existence of the node and successfully exchanging data with the discovered node.

3. The mobile client in accordance with claim 2, wherein the at least one node further includes at least one index node and optionally at least one non-index node that is not an index node, and each index node forms a membership community with itself and optionally one or more non-index nodes of the at least one non-index node;
   wherein the index node of each membership community maintains information related to applications included with the at least one member in its community; and
   wherein the mobile client discovering a node further includes discovering an index node of the at least one index node and joining its membership community.

4. The mobile client in accordance with claim 3, wherein the mobile client discovers the index node and joins its membership community by transmitting to the at least one node via the network a request for an address associated with respective index nodes of the at least one index node, receiving at least one address in response to the request, selecting an address from the received at least one address, sending a request to the index node having the selected address to join the index node's membership community, and receiving a message from the index node accepting the mobile client as a member of its membership community.

5. The mobile client in accordance with claim 3, wherein the mobile client's membership in the index node's membership community is periodically renewed by an exchange of renewal messages between the mobile client and the index node, wherein the mobile client's continued membership in the membership community is contingent upon a successful exchange of the renewal messages.

6. The mobile client in accordance with claim 1, wherein the mobile client is provided by a node of the at least one node coupled to the network with information about at least one application available to the mobile client including information enabling the mobile client to discover the at least one available application.

7. The mobile client in accordance with claim 6, wherein the mobile client requests an application having a particular characteristic and the information about the at least one available application provided to the mobile client is in reference to applications having the particular characteristic, and wherein the mobile client selects from the at least one available application an application to activate.

8. The mobile client in accordance with claim 6, wherein the mobile client further comprises:
   a display device for displaying information to a user of the mobile client;
   a user input device for receiving information input by the user, and
   a user interface, wherein when the mobile client discovers one of the at least one available applications and when the discovered application is being executed by the processor of the node it is associated with, the user interface provides for displaying information related to the execution of the discovered application on the display device, wherein a user of the mobile client can interact with the discovered application while it is being executed via the display on the display device and by operating the user input device.

9. The mobile client in accordance with claim 1, wherein activating one of the applications by the mobile client includes receiving standards related to interacting with the host processor and the application and complying with the standards.

10. The mobile client in accordance with claim 1, wherein the application is an Extensible Interface Platform (EIP) application and the platform is an EIP platform.

11. A method for a mobile client to interact with nodes coupled to a network, the method comprising:
coupling the mobile client via hardware and software to a network, wherein in addition to the mobile client at least one node including at least one printer device is coupled to the network, wherein one or more nodes of the at least one node respectively includes software application executable by a processor associated with the respective node on a software platform executed by the processor, wherein the application can interact with a printer device of the at least one printer device to cause the printer device to perform a function;
executing on a hardware processor of the mobile client a software platform;
discovering by the mobile client while executing the software platform at least one application executable by respective processors associated with the at least one node;
wherein discovering an application comprises:
ascertaining that the application is available for execution;
filtering out from the at least one available application each application of the at least one available application that requires a user to perform a physical action with a printer device of the at least one printer device; and
providing information via a user interface wherein the provided information includes information providing the ability to activate the at least one application that was not filtered out.

12. The method in accordance with claim 11,
wherein executing the platform includes discovering one or more nodes of at least one node that is coupled to the network;
wherein the mobile client discovering a node includes:
ascertaining the existence of the node; and
successfully exchanging data with the discovered node.

13. The method in accordance with claim 12, wherein the at least one node further includes at least one index node and optionally at least one non-index node that is not an index node, and each index node forms a membership community with itself and optionally one or more non-index nodes of the at least one non-index node;
wherein the index node of each membership community maintains information related to applications included with the at least one member in its community;
wherein the index node of each membership community exchanges information with other index nodes of the at least one node, including the information maintained by the respective index nodes; and
wherein the discovering by the mobile client one or more tangible nodes further comprises discovering by the mobile client an index node of the at least one index node; and
wherein the method further comprises the mobile client joining the discovered index node's membership community.

14. The method in accordance with claim 13, wherein the discovering the index node by the mobile client and joining its membership community comprises:
transmitting to the at least one node via the network a request for an address associated with respective index nodes of the at least one index node;
receiving at least one address in response to the request;
selecting an address from the received at least one address;
sending a request to the index node having the selected address to join the index node's membership community; and
receiving a message from the index node which confirms acceptance of the mobile client as a member of its membership community.

15. The method in accordance with claim 11, wherein discovering the at least one application software module comprises receiving from a node of the at least one node coupled to the network, information about at least one available application which includes information that enables the mobile client to discover the at least one available application.

16. The method in accordance with claim 11, wherein discovering the at least one application software module comprises:
requesting by the mobile client from a node of the at least one node coupled to the network an application having a particular characteristic;
receiving at the mobile client in response to the requesting information about the at least one available application for at least one applications having the particular characteristic; and
selecting by the mobile client an application to activate from the at least one available application.

17. The method in accordance with claim 16, wherein the discovering the at least one application further comprises:
displaying to a user of the mobile device the at least one available application that was not filtered out;
wherein the user selects the application to activate from the displayed applications.

18. The method in accordance with claim 11, further comprising:
the mobile client interacting with a discovered application, comprising:
displaying information related to the execution of the application to a user of the mobile device;
receiving information input by the user of the mobile client; and
providing the received information for execution of the application.

19. The method in accordance with claim 11, wherein activating one of the applications by the mobile client comprises:
receiving standards related to interacting with the host processor and the application; and
complying with the standards.

20. The method according to claim 11, wherein the application is an Extensible Interface Platform (EIP) application and the platform is an EIP platform.

21. A network system comprising:
at least one node coupled to a network and to at least one mobile client via the network, each node including a hardware processor, communication hardware and communication software executable by the associated processor for enabling the respective node to couple to the network, and one or more respective nodes of the at least one node further include a software application executable by the processor associated with the respective node on a software platform executed by the processor, wherein the application can interact with a printer device of at least one printer device coupled to the network to cause the printer device to perform a function;

wherein the application is discoverable by the at least one mobile client;

wherein the application is filterable when requiring a user to physically perform an action on the printer device of the at least one printer device; and wherein the application is discovered when a node of the at least one node provides the mobile client with information about the application including a means for activating the application.

22. The network system in accordance with claim 21, wherein the at least one node further includes at least one index node and optionally one or more non-index nodes, wherein the at least one non-index node includes nodes of the at least one node that are not an index node; and wherein the platform of each index node of the at least one index node includes a membership server module which manages a membership community having at least one member including the index node itself, optionally one or more non-index nodes and optionally one or more mobile clients, wherein each non-index node member of the at least one member of the membership community associated with an index node of the at least one index node provides the index node with information related to each application that it has, and the index node provides each mobile client member with information about at least one available application including information enabling the mobile client member to discover the at least one available application.

23. The network system in accordance with claim 21, wherein the application is an Extensible Interface Platform (EIP) application and the platform is an EIP platform.

* * * * *